United States Patent [19]
Fisher

[11] Patent Number: 4,805,414
[45] Date of Patent: Feb. 21, 1989

[54] PROCESS TO RECOVER HYDROGEN-FREE HIGHER BOILING SYNTHESIS GAS COMPONENT

[75] Inventor: Theodore F. Fisher, Tonawanda, N.Y.

[73] Assignee: Union Carbide Corporation, Danbury, Conn.

[21] Appl. No.: 133,430

[22] Filed: Dec. 15, 1987

[51] Int. Cl.⁴ .................................................. F25J 3/02
[52] U.S. Cl. ................................ 62/28; 62/29; 62/40
[58] Field of Search ............... 62/9, 11, 17, 20, 22, 62/23, 24, 27, 28, 29, 38, 40

[56] References Cited

U.S. PATENT DOCUMENTS

| | | |
|---|---|---|
| 3,037,359 | 6/1962 | Knapp ...................................... 62/22 |
| 3,187,485 | 6/1965 | Konz ....................................... 55/48 |
| 3,327,487 | 6/1967 | Karwat .................................... 62/13 |
| 3,625,017 | 12/1971 | Hoffman ............................. 62/40 X |
| 3,675,434 | 7/1972 | Crawford et al. ....................... 62/23 |
| 3,805,536 | 4/1974 | Lynn ....................................... 62/17 |
| 3,805,537 | 4/1974 | Forg et al. .............................. 62/22 |
| 4,338,108 | 7/1982 | Isalski et al. ........................... 62/22 |
| 4,473,385 | 9/1984 | Fabian et al. ........................... 62/30 |
| 4,548,618 | 10/1985 | Linde et al. ............................. 55/16 |
| 4,762,542 | 8/1988 | Mishkovsky et al. .............. 62/40 X |

*Primary Examiner*—Steven E. Warner
*Attorney, Agent, or Firm*—Stanley Ktorides

[57] ABSTRACT

A process to recover higher boiling synthesis gas component substantially free of hydrogen comprising partial condensation of a synthesis gas reaction stream, defined stripping of hydrogen out of the resulting liquid, and fractional distillation of the resulting fluid.

20 Claims, 2 Drawing Sheets

PROCESS TO RECOVER HYDROGEN-FREE HIGHER BOILING SYNTHESIS GAS COMPONENT

TECHNICAL FIELD

This invention relates generally to the recovery of synthesis gas components wherein one of the synthesis gas components is hydrogen, and more particularly, is a process wherein the higher boiling synthesis gas component is recovered substantially free of hydrogen.

BACKGROUND ART

Hydrogen and a higher boiling compound are often used as synthesis gas components for the formation of useful chemical compounds. For example, synthesis gas having hydrogen and nitrogen components in a 3:1 molar ratio is employed to form ammonia. Another example is synthesis gas having hydrogen and carbon monoxide components in a 2:1 ratio which is used to form methanol. Still another example is synthesis gas having hydrogen and carbon monoxide components in a 1:1 ratio which is employed in the oxo process to form $C_4$ and heavier alcohols and aldehydes.

The synthesis gas mixture is in most cases generated by steam reforming of hydrocarbons, in particular natural gas. Methane conversion in the steam reforming process is incomplete, so that low percentage levels of methane remain as an impurity in the synthesis gas. Generation of ammonia synthesis gas employs, in addition, a secondary reforming step, wherein air is introduced in a controlled manner to supply the necessary amount of nitrogen. The oxygen is consumed by partial oxidation of residual hydrocarbons. yielding additional synthesis gas. The argon content of the air remains, however. as an impurity in the ammonia synthesis gas.

In the ammonia synthesis process, fresh synthesis gas is added to a recycle loop which recirculates through the ammonia synthesis reactor. Unreacted components from the product side of the reactor are separated from the ammonia product, which is condensed by cooling the stream, and recycled through the reactor together with the fresh synthesis gas. Inert components, specifically methane and argon, build-up in concentration within this loop. In order to limit this build-up, a continuous purge fraction is normally withdrawn from the recycle loop, thus removing an absolute quantity of the inert components which equals that which has been brought into the loop by the fresh synthesis gas. It is often desirable to recover the unreacted synthesis gas components from this purge stream for recycle or other use. It may also be desirable to recover the impurities as additional products from the purge gas stream.

The methanol or oxo processes are frequently used in conjunction with other processes which require a relatively pure source of either hydrogen or carbon monoxide. It is often desirable to generate sufficient synthesis gas of the correct overall composition to satisfy the total hydrogen and carbon monoxide requirements of the facility. A portion of the gas may then be processed to recover pure component products. The hydrogen to carbon monoxide ratio(s) in the remaining synthesis gas fraction(s) may then be adjusted, as necessary, by appropriate blending of the various streams.

Cryogenic processing is one means which has heretofore been employed for the recovery of components from a synthesis gas stream. The cryogenic process employs a first partial condensation step which separates a hydrogen-rich vapor fraction from the remainder of the stream. The purity of the hydrogen which can be produced by this step is limited, since the low temperatures which would be required for complete condensation of the higher boiling synthesis gas component would result in freezing of the condensed fraction. The hydrogen-rich vapor might be directly utilized for recycle to the synthesis gas process. However, if high purity hydrogen is required, an additional processing method must be employed. Pressure swing adsorption is an example of such a method.

The condensate which is produced by the partial condensation step may be further processed in one or more cryogenic distillation columns in order to separate the higher boiling synthesis gas component and the heavier impurity fraction(s). However, the conventional recovery methods cannot recover the higher boiling synthesis gas component without a significant hydrogen presence in the stream. This is because hydrogen has significant solubility in the condensate which is formed in the presence of the hydrogen-rich vapor product. While this hydrogen contamination is not a problem when the higher boiling synthesis gas component is recycled for synthesis gas reaction, it may be a problem if it is desired to employ the recovered higher boiling synthesis gas component in an application which requires very high purity, and especially in an application which is sensitive to the presence of hydrogen.

Accordingly, it is an object of this invention to provide a process to recover, from a hydrogen-containing synthesis gas stream, a higher boiling synthesis gas component substantially free of hydrogen.

SUMMARY OF THE INVENTION

The above and other objects which will become apparent to one skilled in the art upon a reading of this disclosure are attained by a process to recover substantially hydrogen-free higher boiling synthesis gas component comprising:

(A) providing a feed comprising hydrogen, higher boiling synthesis gas component, and heavier fraction(s);

(B) partially condensing the feed to produce hydrogen-rich vapor and hydrogen-containing liquid;

(C) passing the hydrogen-containing liquid into a stripping column containing at least two equilibrium stages, and down the stripping column through all of the equilibrium stages against upflowing vapor;

(D) stripping hydrogen from the downflowing liquid into the upflowing vapor to produce substantially hydrogen-free fluid;

(E) passing the substantially hydrogen-free fluid into at least one cryogenic fractional distillation column;

(F) separating the substantially hydrogen-free fluid in said column(s) into substantially hydrogen-free higher boiling synthesis gas component, and heavier fraction(s); and (G) recovering substantially hydrogen-free higher boiling synthesis gas component product.

As used herein, the term "higher boiling synthesis gas component" means a synthesis gas component having a higher boiling point than hydrogen. Examples of such components are nitrogen and carbon monoxide.

As used herein, the term "heavier fraction" means an element or compound having lower volatility than the higher boiling synthesis gas component in the feed.

The term "fractional distillation column", as used herein means a distillation or fractionation column or zone, i.e., a contacting column or zone wherein liquid and vapor phases are countercurrently contacted to effect separation of a fluid mixture, as for example, by contacting of the vapor and liquid phases on a series of vertically spaced trays or plates mounted within the column or alternatively, on packing elements with which the column is filled. For a further discussion of distillation columns see the Chemical Engineers' Handbook, Fifth Edition, edited by R. H. Perry and C. H. Chilton, McGraw-Hill Book Company, New York, Section 13, "Distillation" B. D. Smith et al., page 13—3 *The Continuous Distillation Process.*

The term "indirect heat exchange", as used herein means the bringing of two fluid streams into heat exchange relation without any physical contact or intermixing of the fluids with each other.

As used herein, the term "tray" means a contacting stage, which is not necessarily an equilibrium stage, and may mean other contacting apparatus such as packing having a separation capability equivalent to one tray.

As used herein, the term "equilibrium stage" means a vapor-liquid contacting stage whereby the vapor and liquid leaving the stage are in mass transfer equilibrium, e.g. a tray having 100 percent efficiency or a packing element height equivalent to one theoretical plate (HETP).

As used herein, the term "stripping column" means a contacting column or zone operated with sufficient vapor upflow relative to liquid downflow to achieve separation of a volatile component such as hydrogen from the liquid into the vapor in which the volatile component such as hydrogen becomes progressively richer upwardly.

DETAILED DESCRIPTION

Figure 1:
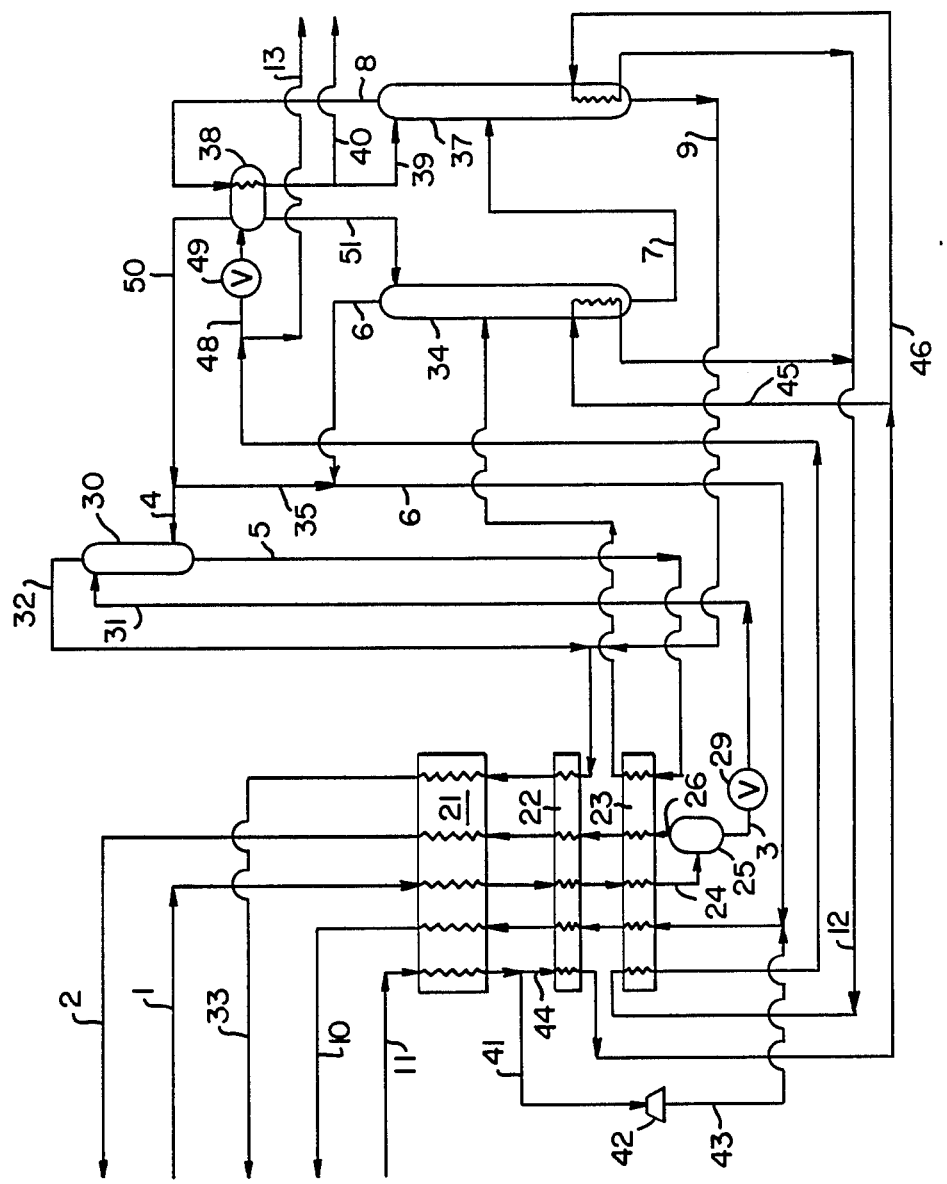
FIG. 1 is a schematic flow diagram of one preferred embodiment of the process of the invention wherein the feed is taken from ammonia synthesis purge gas and the higher boiling synthesis gas component is nitrogen.

The process of this invention is directed to recovering higher boiling synthesis gas component substantially free of hydrogen from a synthesis gas stream which also contains one or more heavier fractions.

One commercially important example where the process of this invention will find use is in the recovery of nitrogen from the purge gas from an ammonia synthesis recycle loop. In the synthesis of ammonia, hydrogen and nitrogen synthesis gas components react to form ammonia by the reaction $$3H_2 + N_2 \rightarrow 2NH_3$$

After ammonia is recovered by condensing it out from the reaction stream, the remaining stream which contains unreacted hydrogen and nitrogen is combined with fresh synthesis gas and recycled through the reactor. The stream also contains methane and argon heavier fractions which have been introduced with the fresh synthesis gas and act as inerts in the reactor, as well as residual unrecovered ammonia. The methane and argon build-up in the recycle loop to a concentration at which they must be purged. Removal of the purge fraction results in a loss of synthesis gas components, unless the purge gas is further processed.

Another commercially important example where the process of this invention will find use is in the recovery of pure carbon monoxide from a fraction of the synthesis gas reaction stream which is generated for the synthesis of methanol. In this synthesis, hydrogen and carbon monoxide synthesis gas components react to form methanol by the reaction.

$$2H_2 + CO \rightarrow CH_3OH$$

The methanol synthesis gas stream contains hydrogen and carbon monoxide in a 2:1 molar ratio and also contains methane as a heavier fraction as a result of incomplete conversion of methane in the steam reforming process by which the synthesis gas is generated.

The feed stream comprising from 48 to 85 percent hydrogen, from 10 to 48 percent higher boiling synthesis gas component, and from 1 to 34 percent of one of more heavier fractions is cooled and partially condensed to produce a hydrogen-rich vapor and a hydrogen-containing liquid. The feed stream is at an elevated pressure, preferably at a pressure of at least 10 atmospheres. The hydrogen-rich vapor, which generally has a hydrogen concentration within the range of from 84 to 97 percent is removed from the process and may be recovered as product hydrogen.

The hydrogen-containing liquid, which also comprises higher boiling synthesis gas component and heavier fraction(s), is passed into a stripping column containing at least two equilibrium stages and operating at a pressure within the range of from 1.2 to 8 atmospheres (atm), preferably 1.5 to 3 atm. The stripping column preferably contains from 2 to 5 equilibrium stages. The liquid is passed down the stripping column through all of the equilibrium stages against upflowing vapor. The vapor may be from any convenient source. One particularly preferred source is substantially hydrogen-free higher boiling synthesis gas component taken from the downstream cryogenic distillation, as will be explained more fully later. Another source of the upflowing vapor could be reboiling liquid at the bottom of the stripping column. Still another source of the upflowing vapor comprises hydrogen-free fluid employed to reboil the fractional distillation column(s).

The stripping column may contain trays or packing. As the liquid flows down through the stages against upflowing vapor, hydrogen within the liquid is stripped into the upflowing vapor. In a preferred embodiment, the hydrogen-containing liquid is reduced in pressure prior to introduction into the stripping column. This enhances the efficiency of the hydrogen stripping within the column.

The stripping operation produces hydrogen-containing vapor, which is passed out of the column and may be recovered, and substantially hydrogen-free fluid. Preferably the substantially hydrogen-free fluid is liquid which is then taken from the stripping column, heated and partially vaporized, and introduced into a cryogenic factional distillation column at an intermediate point of the column. Preferably the heating and partial vaporization of the substantially hydrogen-free fluid is by indirect heat exchange with cooling feed. The substantially hydrogen-free fluid is introduced into at least one fractional distillation column. Suitable fractional distillation column arrangements include a single column, two or more columns in series, and a double column wherein a higher pressure column and a lower pressure column are in heat exchange relation.

Within the fractional distillation column(s) the substantially hydrogen-free fluid is separated into substantially hydrogen-free higher boiling synthesis gas component, and into one or more heavier fractions. The substantially hydrogen-free higher boiling synthesis gas component is recovered as product containing at most about 100 parts per million (ppm) hydrogen. Generally the product synthesis gas component will have less than 30 ppm hydrogen. If desired, the heavier fraction(s) may also be recovered from the fractional distillation column separation.

As indicated previously, a particularly preferred embodiment of this invention comprises the passage of a portion of the substantially hydrogen-free higher boiling synthesis gas component to the stripping column to serve as stripping column upflowing vapor. When this preferred embodiment of the invention is employed, the vapor passed to the stripping column comprises from 5 to 30 percent of the substantially hydrogen-free higher boiling synthesis gas component produced in the distillation column(s).

The substantially hydrogen-free higher boiling synthesis gas component is taken from the fractional distillation column(s) as a vapor and can be recovered as such, or may be liquified and recovered as liquid.

FIG. 1 illustrates one example of the process of this invention for the recovery of nitrogen synthesis gas component substantially free of hydrogen.

Referring now to FIG. 1, feed stream 1 comprising from 50 to 66 percent hydrogen, 16 to 22 percent nitrogen, and 12 to 24 percent argon and methane, at a pressure within the range of from 40 to 80 atmospheres. is cooled and partially condensed by indirect heat exchange with return streams by passage through heat exchangers 21, 22 and 23 from which it emerges as partially condensed stream 24. Partially condensed stream 24 is passed into phase separator 25 wherein it is separated into hydrogen-rich vapor and hydrogen-containing liquid. The hydrogen-rich vapor is removed from phase separator 25 as stream 26, warmed by passage through heat exchangers 23, 22 and 21, and removed, and, if desired, recovered as hydrogen stream 2, containing from about 88 to 95 mole percent hydrogen. Hydrogen-containing liquid is removed from phase separator 25 as stream 3, reduced in pressure by passage through valve 27 to a pressure less than 8 atmospheres and passed as stream 31 into stripping column 30.

Stripping column 30 contains 3 equilibrium stages and operates at a pressure of about 25 pounds per square inch absolute (psia). Liquid 31 is passed down through each of the equilibrium stages against upflowing vapor. Hydrogen is stripped into the upflowing vapor which is removed from column 30 as stream 32, warmed by passage through heat exchangers 22 and 21, and passed out of the process as stream 33. Hydrogen-free liquid is removed from stripping column 30 as stream 5, warmed and partially vaporized against cooling feed in heat exchanger 23, and passed into fractional distillation column 34 wherein it is separated into substantially hydrogen-free nitrogen vapor and into liquid rich in argon and methane. The nitrogen vapor is removed from column 34 as stream 6. Stream 6 is warmed by passage through heat exchangers 23, 22 and 21 and recovered as substantially hydrogen-free nitrogen product 10. Argon-methane liquid is passed out of column 34 as stream 7 and into fractional distillation column 37 wherein it is separated into argon-rich vapor and methane-rich liquid. Both columns 34 and 37 preferably operate at pressures less than 2 atmospheres.

Methane-rich liquid is passed out of column 37 as stream 9, combined with overhead vapor 32 from stripping column 30, warmed by passage through heat exchangers 22 and 21 and passed out of the process in stream 33. Argon-rich vapor is removed from column 37 as stream 8 and condensed against liquid nitrogen in heat exchanger separator 38. A portion 39 is returned to column 37 as reflux and another portion 40 is passed out of the process and recovered as liquid argon product.

The distillation columns are driven by high pressure nitrogen 11 having a pressure within the range of from 15 to 30 atmospheres. Stream 11 is cooled through heat exchanger 21 and a portion 41 expanded through turboexpander 42 to develop refrigeration for the process. Cool expanded stream 43 emerges from turboexpander 42, then is warmed by passage through heat exchangers 23, 22 and 21 to cool the incoming feed, and is recovered along with the product substantially hydrogen-free nitrogen in stream 10. The remainder 44 of stream 11 is further cooled through heat exchanger 22 and divided into two parts 45 and 46. Stream 45 reboils the column 34 bottoms and stream 46 reboils the column 37 bottoms. Streams 45 and 46 are then recombined into stream 12 which is cooled through heat exchanger 23. A first portion 13 is recovered as liquid nitrogen while a second portion 48 is expanded through valve 49 and partially vaporized and separated in heat exchanger separator 38. A portion of vapor 50 from separator 38 is passed as stream 4 and into stripping column 30 as upflowing vapor. Portion 4 comprises from 15 to 40 percent of stream 50. The remainder 35 of stream 50 is combined with stream 6 from column 34 and stream 43 from turboexpander 42, warmed by passage through heat exchangers 23, 22 and 21 to cool the incoming feed, and recovered along with the product substantially hydrogen-free nitrogen in stream 10. Liquid 51 from separator 38 is passed into column 34 as reflux.

A computer simulation of the embodiment of the process of the invention illustrated in FIG. 1 was carried out and the results are reported in Table I. The stream numbers in Table I correspond to those of FIG. 1. Pressure is reported in atmospheres, temperature in degrees Kelvin, flow in pound moles per hour and composition in mole percent.

TABLE I

| STREAM | FLOW LB MOL/HR | PRESSURE ATMA | TEMP. K | COMPOSITION - MOL % | | | |
|---|---|---|---|---|---|---|---|
| | | | | $H_2$ | $N_2$ | Ar | $CH_4$ |
| 1 | 1000 | 66.7 | 313.1 | 55.3 | 18.6 | 3.6 | 22.5 |
| 2 | 559 | 65.8 | 309.6 | 93.1 | 5.7 | 0.4 | 0.8 |
| 3 | 441 | 66.2 | 88.0 | 7.2 | 35.1 | 7.8 | 49.9 |
| 4 | 30 | 1.6 | 83.2 | — | 99.9 | 0.1 | — |
| 5 | 409 | 1.6 | 90.0 | — | 39.2 | 7.8 | 53.0 |
| 6 | 368 | 1.9 | 83.1 | — | 99.9 | 0.1 | — |

TABLE I-continued

| STREAM | FLOW LB MOL/HR | PRESSURE ATMA | TEMP. K | COMPOSITION - MOL % | | | |
|---|---|---|---|---|---|---|---|
| | | | | $H_2$ | $N_2$ | Ar | $CH_4$ |
| 7 | 248 | 2.1 | 112.9 | — | — | 12.6 | 87.4 |
| 8 | 31 | 1.3 | 89.3 | — | — | ~100 | — |
| 9 | 217 | 1.5 | 116.8 | — | — | <0.1 | ~100 |
| 10 | 699 | 1.4 | 309.6 | — | 99.9 | 0.1 | — |
| 11 | 571 | 23.7 | 313.0 | — | 99.9 | 0.1 | — |
| 12 | 335 | 23.2 | 118.7 | — | 99.9 | 0.1 | — |
| 13 | 3 | 23.2 | 88.0 | — | 99.9 | 0.1 | — |

Figure 2:
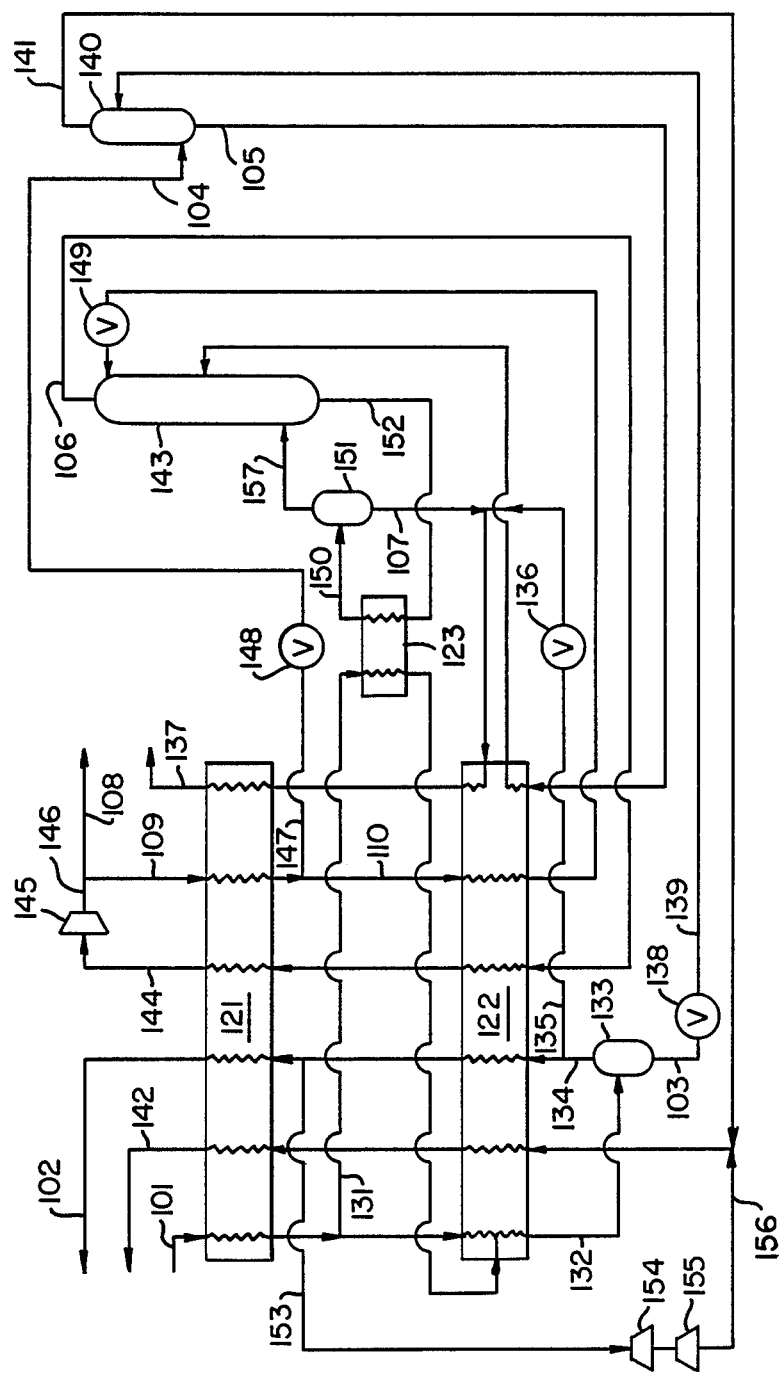
FIG. 2 is a schematic flow diagram of one preferred embodiment of the process of the invention wherein the feed is taken from a methanol or oxo process synthesis gas stream and the higher boiling synthesis gas component is carbon monoxide.

FIG. 2 illustrates another example of the process of this invention for the recovery of carbon monoxide synthesis gas component substantially free of hydrogen.

Referring now to FIG. 2, feed stream 101 comprising from 48 to 85 percent hydrogen, 10 to 48 percent carbon monoxide and 1 to 5 percent methane, at a pressure within the range of from 10 to 30 atmospheres is cooled and partially condensed by indirect heat exchange with return streams by passage through heat exchangers 121 and 122. Feed stream 101 also contains some nitrogen which is removed from the process with the product carbon monoxide. A portion 131 of the feed is cooled against reboiling distillation column bottoms in heat exchanger 123 and returned to the feed stream. Partially condensed stream 132 is passed into phase separator 133 wherein it is separated into hydrogen-rich vapor and hydrogen-containing liquid. The hydrogen-rich vapor is removed from separator 133 as stream 134, warmed by passage through heat exchangers 122 and 121 and removed, and, if desired, recovered as hydrogen stream 102 containing from 84 to 97 mole percent hydrogen. If a pure hydrogen product is desired, further processing of stream 102 by, for example, pressure swing adsorption, may be carried out. A portion 135 of the hydrogen-rich vapor may be throttled to a lower pressure through valve 136 prior to combination with stream 107, as described below. warming through heat exchangers 122 and 121 and separate passage out of the system as stream 137. Hydrogen-containing liquid is removed from phase separator 133 as stream 103, reduced in pressure by passage through valve 138 to a pressure less than 6 atmospheres and passed as stream 139 into stripping column 140.

Stripping column 140 contains 3 equilibrium stages and operates at a pressure of about 25 psia. Liquid 139 is passed down through each of the equilibrium stages against upflowing vapor. Hydrogen is stripped into the upflowing vapor which is removed from column 140 as stream 141, warmed by passage through heat exchangers 122 and 121, and passed out of the process as stream 142. Hydrogen-free liquid is removed from stripping column 140 as stream 105, warmed and partially vaporized against cooling feed in heat exchanger 122, and passed into fractional distillation column 143 wherein it is separated into substantially hydrogen-free carbon monoxide vapor and into liquid rich in methane. The carbon monoxide vapor is removed from column 143 as stream 106 and warmed by passage through heat exchangers 122 and 121 from which it emerges as stream 144. In this preferred carbon monoxide recovery embodiment, a portion of the product stream 144 is reemployed within the process. In this embodiment, stream 144 is compressed in compressor 145 to a pressure within the range of from 10 to 30 atmospheres. A portion 108 of compressed stream 146 is recovered as product carbon monoxide substantially free of hydrogen. Portion 108 comprises from 70 to 85 percent of stream 146. Another portion 109 of stream 146 is cooled by passage through heat exchanger 121 and divided into portions 147 and 110. Portion 147 is throttled to a lower pressure through valve 148 and passed as stream 104 into stripping column 140 as upflowing vapor. Portion 147 comprises from 5 to 15 percent of stream 146. Portion 110 is further cooled by passage through heat exchanger 122, throttled to a lower pressure through valve 149 and passed into distillation column 143 as reflux. Portion 110 comprises from 15 to 20 percent of stream 146. Distillation column 143 operates at a pressure less than 2 atmospheres. Methane-rich liquid bottoms are removed from column 143 as stream 152 and partially vaporized against cooling feed in heat exchanger 123. Two-phase stream 150 is passed into phase separator 151 wherein it is separated into vapor 157 for return to distillation column 143, and into liquid 107 which is combined with stream 135, warmed by passage through heat exchangers 122 and 121 and passed out and recovered as methane rich stream 137.

Refrigeration for the process is developed by expanding a portion 153 of the hydrogen-rich vapor by passage through turboexpanders 154 and 155 and warming this expanded stream 156 by passage through heat exchangers 122 and 121 to cool incoming feed. The warmed expanded stream may then be removed from the system as stream 142. Stream 142 may optionally be compressed and returned to the feed stream to recover its contained hydrogen and carbon monoxide as products.

A computer simulation of the embodiment of the process of the invention illustrated in FIG. 2 was carried out and the results are reported in Table II. The stream numbers in Table II correspond to those of FIG. 2 and the pressure, temperature, flow and composition are in the same units as in Table I.

TABLE II

| STREAM | FLOW LB MOL/HR | PRESSURE ATMA | TEMP. K | COMPOSITION - MOL % | | | |
|---|---|---|---|---|---|---|---|
| | | | | $H_2$ | $N_2$ | CO | $CH_4$ |
| 101 | 100 | 16.3 | 311.7 | 75.4 | 0.6 | 21.1 | 2.9 |
| 102 | 664 | 15.7 | 306.6 | 88.5 | 0.4 | 10.6 | 0.5 |
| 103 | 153 | 16.0 | 86.7 | 2.7 | 1.8 | 79.5 | 16.0 |
| 104 | 10 | 1.6 | 139.0 | — | 2.2 | 97.7 | 0.1 |
| 105 | 144 | 1.6 | 85.3 | — | 1.8 | 81.2 | 17.0 |
| 106 | 157 | 1.3 | 84.2 | — | 2.2 | 97.7 | 0.1 |
| 107 | 26 | 1.4 | 108.9 | — | — | 5.0 | 95.0 |
| 108 | 119 | 14.5 | 309.1 | — | 2.2 | 97.7 | 0.1 |

TABLE II-continued

| STREAM | FLOW LB MOL/HR | PRESSURE ATMA | TEMP. K | COMPOSITION - MOL % | | | |
|---|---|---|---|---|---|---|---|
| | | | | H₂ | N₂ | CO | CH₄ |
| 109 | 38 | 14.5 | 309.1 | — | 2.2 | 97.7 | 0.1 |
| 110 | 28 | 14.3 | 139.8 | — | 2.2 | 97.7 | 0.1 |

Now by the use of the process of this invention, one can efficiently and effectively recover unreacted higher-boiling synthesis gas component substantially free of hydrogen contamination.

Although the process of the invention has been described in detail with reference to two preferred embodiments, those skilled in the art will recognize that there are other embodiments if the invention within the spirit and scope of the claims.

I claim:

1. A process to recover substantially hydrogen-free higher boiling synthesis gas component comprising:
   (A) providing a feed comprising hydrogen, higher boiling synthesis gas component, and heavier fraction(s);
   (B) partially condensing the feed to produce hydrogen-rich vapor and hydrogen-containing liquid;
   (C) passing the hydrogen-containing liquid into a stripping column containing at least two equilibrium stages, and down the stripping column through all of the equilibrium stages against upflowing vapor;
   (D) stripping hydrogen from the downflowing liquid into the upflowing vapor to produce substantially hydrogen-free fluid;
   (E) passing the substantially hydrogen-free fluid into at least one cryogenic fractional distillation column;
   (F) separating the substantially hydrogen-free fluid in said column(s) into substantially hydrogen-free higher boiling synthesis gas component, and heavier fraction(s); and
   (G) recovering substantially hydrogen-free higher boiling synthesis gas component product.

2. The process of claim 1 wherein the feed contains from 48 to 85 mole percent hydrogen.

3. The process of claim 1 wherein the hydrogen-containing liquid is reduced in pressure prior to passage into the stripping column.

4. The process of claim 1 wherein at least some of the upflowing vapor in the stripping column comprises reboiled stripping column bottoms.

5. The process of claim 1 wherein at least some of the upflowing vapor in the stripping column comprises hydrogen-free fluid employed to reboil the fractional distillation column(s).

6. The process of claim 1 wherein a single fractional distillation column is employed.

7. The process of claim 1 wherein at least two fractional distillation columns are employed.

8. The process of claim 1 wherein the substantially hydrogen-free higher boiling synthesis gas component contains not more than 100 ppm hydrogen.

9. The process of claim 1 further comprising recovering at least some of the hydrogen-rich vapor.

10. The process of claim 1 further comprising recovering at least some of the heavier fraction(s).

11. The process of claim 1 further comprising employing a portion of the substantially hydrogen-free synthesis gas component as liquid reflux for at least one fractional distillation column.

12. The process of claim 1 wherein the stripping column contains from 2 to 5 equilibrium stages.

13. The process of claim 1 wherein the higher boiling synthesis gas component is nitrogen.

14. The process of claim 13 wherein the heavier fractions comprise argon and methane.

15. The process of claim 1 wherein the higher boiling synthesis gas component is carbon monoxide.

16. The process of claim 15 wherein the heavier fraction is methane.

17. The process of claim 1 wherein at least some of the upflowing vapor in the stripping column comprises substantially hydrogen-free higher boiling synthesis gas component.

18. The process of claim 17 wherein from 5 to 30 percent of the substantially hydrogen-free higher boiling synthesis gas component produced in the distillation column(s) is employed as upflowing vapor in the stripping column.

19. The process of claim 1 wherein substantially hydrogen-free synthesis gas fluid is warmed by indirect heat exchange with cooling feed prior to passage into the distillation column(s).

20. The process of claim 19 wherein said warming results in partial vaporization of the substantially hydrogen-free synthesis gas fluid.

* * * * *